US007735079B1

(12) United States Patent
Davis et al.

(10) Patent No.: US 7,735,079 B1
(45) Date of Patent: Jun. 8, 2010

(54) SECURELY HOOKING INSTALLATIONS FOR COMPATIBILITY WITH OTHER APPLICATIONS

(75) Inventors: Collin Davis, Los Angeles, CA (US); Ellery Pierce, Los Angeles, CA (US); Brian Powell, El. Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1389 days.

(21) Appl. No.: 11/051,336

(22) Filed: Feb. 4, 2005

(51) Int. Cl.
*G06F 9/445* (2006.01)
(52) U.S. Cl. .................................. 717/174; 717/175
(58) Field of Classification Search ......... 717/168–178, 717/124, 127, 131, 141, 154, 155
See application file for complete search history.

(56) References Cited

U.S. PATENT DOCUMENTS

| 6,314,565 | B1* | 11/2001 | Kenner et al. ............. 717/171 |
| 7,111,055 | B2* | 9/2006 | Falkner ..................... 709/221 |
| 7,415,707 | B2* | 8/2008 | Taguchi et al. ............ 717/174 |
| 7,478,385 | B2* | 1/2009 | Sierer et al. ............... 717/174 |
| 2004/0044996 | A1* | 3/2004 | Atallah ...................... 717/169 |
| 2004/0181790 | A1* | 9/2004 | Herrick ..................... 717/168 |
| 2005/0066325 | A1* | 3/2005 | Mori et al. ................. 717/174 |
| 2006/0101457 | A1* | 5/2006 | Zweifel et al. ............ 717/174 |
| 2006/0161914 | A1* | 7/2006 | Morrison et al. ......... 717/174 |
| 2007/0011672 | A1* | 1/2007 | Bhide et al. ............... 717/174 |
| 2007/0234352 | A1* | 10/2007 | Esders et al. .............. 717/175 |

OTHER PUBLICATIONS

Microsoft Windows Installer, Aug. 2004, http://web.archive.org/web/20040802093723/http://www.microsoft.com/downloads/details.aspx?displaylang=en&FamilyID=CEBBACD8-C094-4255-B702-DE3BB768148F.

* cited by examiner

*Primary Examiner*—Van H Nguyen
(74) *Attorney, Agent, or Firm*—Fenwick & West LLP (57) ABSTRACT

A compatibility module manages compatibility issues between software applications installed on a computing device by intervening with installation of incompatible software applications to ensure compatibility problems are resolved. In one embodiment, an information control module stores compatibility information for a plurality of software applications, and this information describes how to resolve compatibility problems among the software applications. A search module searches for compatibility information, and a testing module analyzes the compatibility information to determine whether installation of a first software application on a computing device is compatible with the plurality of software applications installed on the computing device. Finally, an installation control module regulates the installation based on the result of the compatibility analysis.

16 Claims, 4 Drawing Sheets

SECURELY HOOKING INSTALLATIONS FOR COMPATIBILITY WITH OTHER APPLICATIONS

BACKGROUND OF THE INVENTION

1. Field of the Invention

This invention pertains in general to computer software compatibility, and more specifically to techniques for managing compatibility issues between software application installers.

2. Background Art

Computer system users frequently face compatibility problems when installing software on their computers. Software application installers have a unique problem of not being able to be updated or changed after the software has been released to the public. Typically, software application installers reside on a compact disc (CD) and are not "patchable" or cannot be modified once they have been distributed to the public. However, newer software application installers that are released can have unforeseen compatibility problems with older software application installers, which can often only be solved by expensive technical support calls or user work-around solutions.

A software application installer may have a bug, for example, that causes problems in the functionality of another previously installed software application. An install bug in a 2004 software application might affect the installation of a 2005 version of the software application. However, once the 2004 software application has been shipped to users, the bug cannot be easily fixed. Similarly, a bug in the new 2005 software application that was missed during testing may prevent the installation of the 2005 software over the 2004 software. Additionally, software bugs can cause compatibility problems between products that are different but share components (e.g., a firewall application and an antivirus application). With the growing number of permutations of software applications, it is inevitable that there will be many of these types of issues that software testing cannot prevent.

Some current installer technologies have a mechanism to prevent installation of older software applications over newer applications, but these technologies have several limitations. For example, these technologies may be somewhat effective in preventing an older version of a software application from installing over a newer version, but will be unable to handle compatibility problems between two products that are different but share some components (e.g., an antivirus software application and a firewall software application). These current installer technologies are also static and typically reside on CDs, and thus cannot be modified or "patched" in any way once the software application installer has been shipped to users. In addition, these current installer technologies are not very flexible or user-friendly. Instead of providing software applications with the opportunity to fix issues caused by incompatibilities, the installer technologies either allow the installation that will cause a problem or completely block the installation. User frustration results in either case.

Therefore, there is a need in the art for a technique that will allow effective management of compatibility issues between software application installers, that will permit problems to be resolved after the software application has been shipped, and that will allow the installation to attempt to correct the problem rather than just completely blocking the installation.

DISCLOSURE OF INVENTION

The above need is met by a compatibility module for managing compatibility issues between software applications installed on a computing device by intervening with installation of incompatible software applications to ensure compatibility problems are resolved. In one embodiment, an information control module stores compatibility information for a plurality of software applications, and this information describes how to resolve compatibility problems among the software applications. A search module searches for compatibility information, and a testing module analyzes the compatibility information to determine whether installation of a first software application on a computing device is compatible with the plurality of software applications installed on the computing device. Finally, an installation control module regulates the installation based on the results of the compatibility analysis.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

The compatibility module disclosed herein can set up hooks into software application installers that allow future software applications to modify older software applications to either stop them from installing over the newer application or modify the installation in a way that the incompatibility can be avoided. This can be performed using a secure mechanism that verifies the integrity of all hooks so that hooks cannot be used to create an insecure environment. For a software application to protect itself from an older non-compatible application installing or uninstalling and creating a problem for the newer application, the new application can install with a patch mechanism that is registered to intervene with the incompatible installation or uninstallation and ensure that the compatibility problems are resolved without user interaction. The compatibility module provides an entry point that allows notification to be given to applications regarding compatibility bugs after these applications have already been distributed to users. For example, this compatibility module allows future software applications to make older applications aware of compatibility issues that were not known at the time the older application was written. In some embodiments, the future application is a newer version of the older application, and in some embodiments, the future application is a different software application that just shares some components with the older application. The compatibility module provides opportunities for software applications resolve installation problems when possible. The compatibility module is described in more detail herein.

Figure 1:
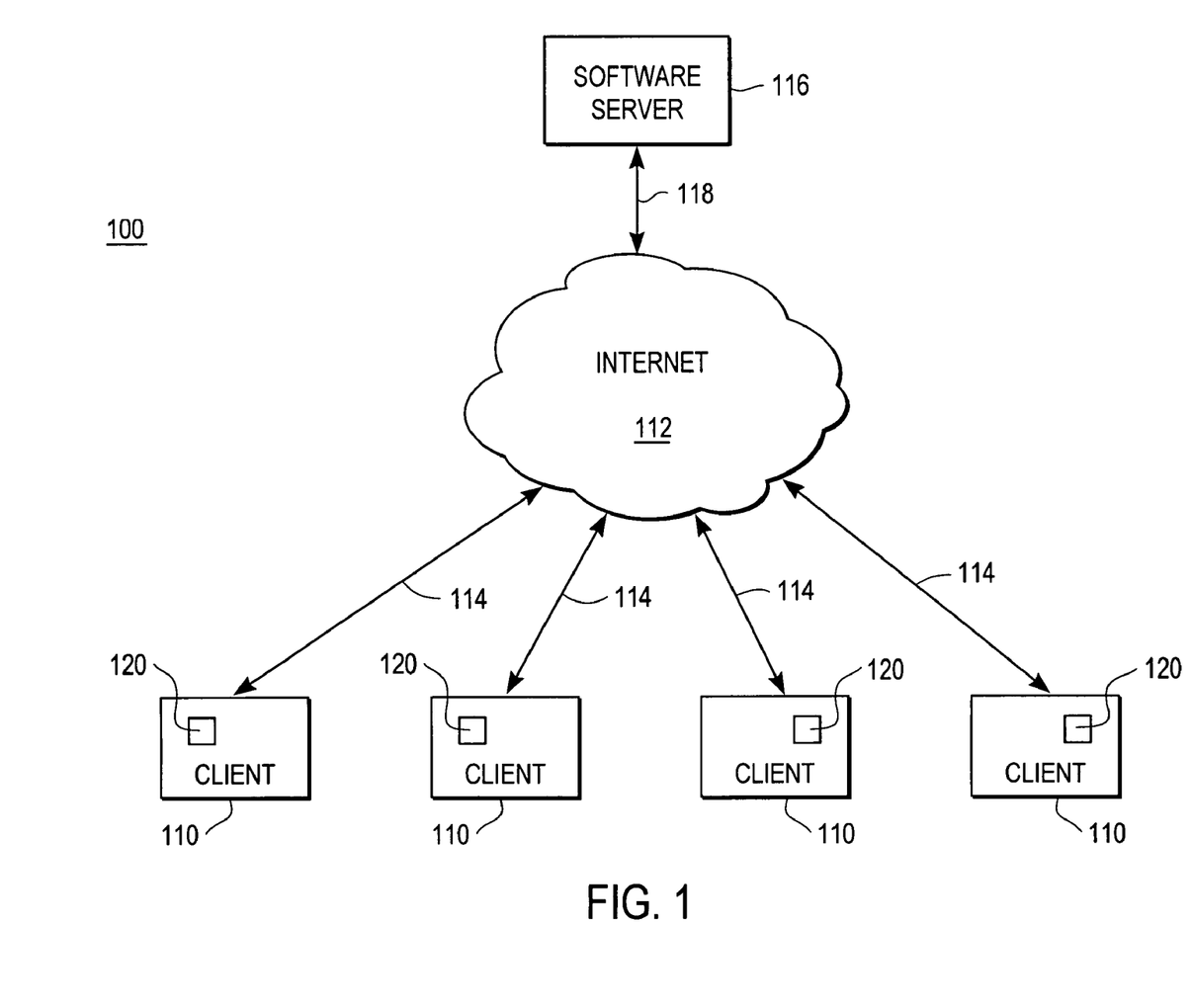
FIG. 1 is a high-level block diagram illustrating an example of a standard computing environment 100, according to one embodiment of the present invention.

FIG. 1 is a high-level block diagram illustrating a computing environment 100 according to an embodiment of the present invention. Multiple client computers 110 are in communication with the Internet 112 or other network, such as a local area network, via communications links 114. Although only four client computers 110 are shown in FIG. 1, there can be thousands or even millions of computer systems coupled to the Internet 112, according to embodiments of the present invention. In one embodiment, the client computers 110 are conventional computer systems. In other embodiments, one or more of the client computers 110 are different electronic devices having Internet connectivity, such as cellular telephones, personal digital assistants (PDAs), etc. A server 116 is also connected to the Internet 112 via a communications link 118.

As is known in the art, the client computers 110 preferably execute an operating system and one or more application programs. As used herein, the term "application" or "software application" can include any type of software or program, a component of a program, a service, an object, a distributed object, or a collection of one or more of these. The operating system controls the operation of the computer system, and some examples of such an operating system include LINUX® or one of the versions of MICROSOFT WINDOWS®. Application programs can enable a number of tasks to be performed on the computer system, such as typical tasks involved in sending and receiving electronic messages.

In FIG. 1, each client computer 110 is connected to the Internet via a communications link 114. Preferably, the communications link 114 utilizes conventional networking technology. For example, in one embodiment a client computer 110 uses a modem to connect over standard telephone lines with an Internet Service Provider (ISP) having a high-speed connection to the Internet 112. In another embodiment, a client computer 110 uses a digital subscriber line (DSL) or cable modem to access the ISP via a telephone line or cable television line, respectively. In yet another embodiment, the client computer 110 uses a network card and Ethernet connection to directly connect to the Internet 112. In still other embodiments, the communications link 114 connects the client computer 110 via a wireless 802.11, Bluetooth, or mobile phone (e.g., CDMA or GSM) network. Thus, many different types of technology can be used to provide the functionality of the communications link 114.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), simple mail transport protocol (SMTP), post office protocol 3 (POP3), and Internet message access protocol (IMAP), and data representations such as the hypertext markup language (HTML) and extensible markup language (XML) to carry and exchange information. Embodiments of the present invention may use other communications protocols and languages to exchange data.

Another communications link 118 connects the server 116 to the Internet 112. The server 116 can send information, such as notifications of software application compatibility problems, across the Internet 112 and to the client computers 110. Additionally, the client computers 110 can send out information (i.e., regarding new compatibility problems) or make requests across the Internet 112 to the server 116, such as requests to verify the compatibility of a software application installation or requests for compatibility information updates. The communications link 118 is generally the same as the communications links 114 connecting the client computers 110 to the Internet 112. Although only one server 116 and associated communications link 118 are shown in FIG. 1, embodiments of the present invention may have multiple servers and/or links. The server 116 may be a conventional computer system or a network of systems.

In the embodiment illustrated in FIG. 1, each client computer 110 executes a compatibility module 120 for managing software application compatibility issues on the client computer 110. The compatibility module 120 can be a discrete application program, or the module 120 can be integrated into another application program or the client computer's 110 operating system. For example, the compatibility module 120 can be a background process that executes in the background and listens for all installation processes and identifies an incompatible installation. In one embodiment, the compatibility module 120 is configured to execute and monitor the client computer 110 at all times when the client computer 110 is active. In another embodiment, the compatibility module 120 is adapted to check for compatibility problems in response to a specific command from a user of the client computer 110 or in response to another event. The compatibility module 120 can be configured to monitor for a variety of types of compatibility problems that will affect installation of a software application, including compatibility with older versions of the application over which a user is attempting to install a newer version, compatibility with older or newer applications that are different but share components with the application being installed, etc.

The compatibility module 120 is adapted for managing of compatibility problems by storing compatibility information for a plurality of software applications, and this information describes how to resolve compatibility problems among the applications. In one embodiment, the compatibility module 120 creates a compatibility file for the software applications, a copy of which is stored in a directory associated with the application. The term "compatibility information" or "compatibility file," as used herein, can include any type of file or collection of files, a portion of a file, a dynamic link library (DLL), a configuration file, an object, network service or daemon, a collection of information or data, a program, and the like. As used herein, the term "directory" can include any type of collection of files or listing of files, folders, subdirectories, a description of one or more entries in a file system, a relational database, a object database, distributed or internet file system, virtual file system, sub-portion of a file, an entry in a registry, and the like.

Figure 2:
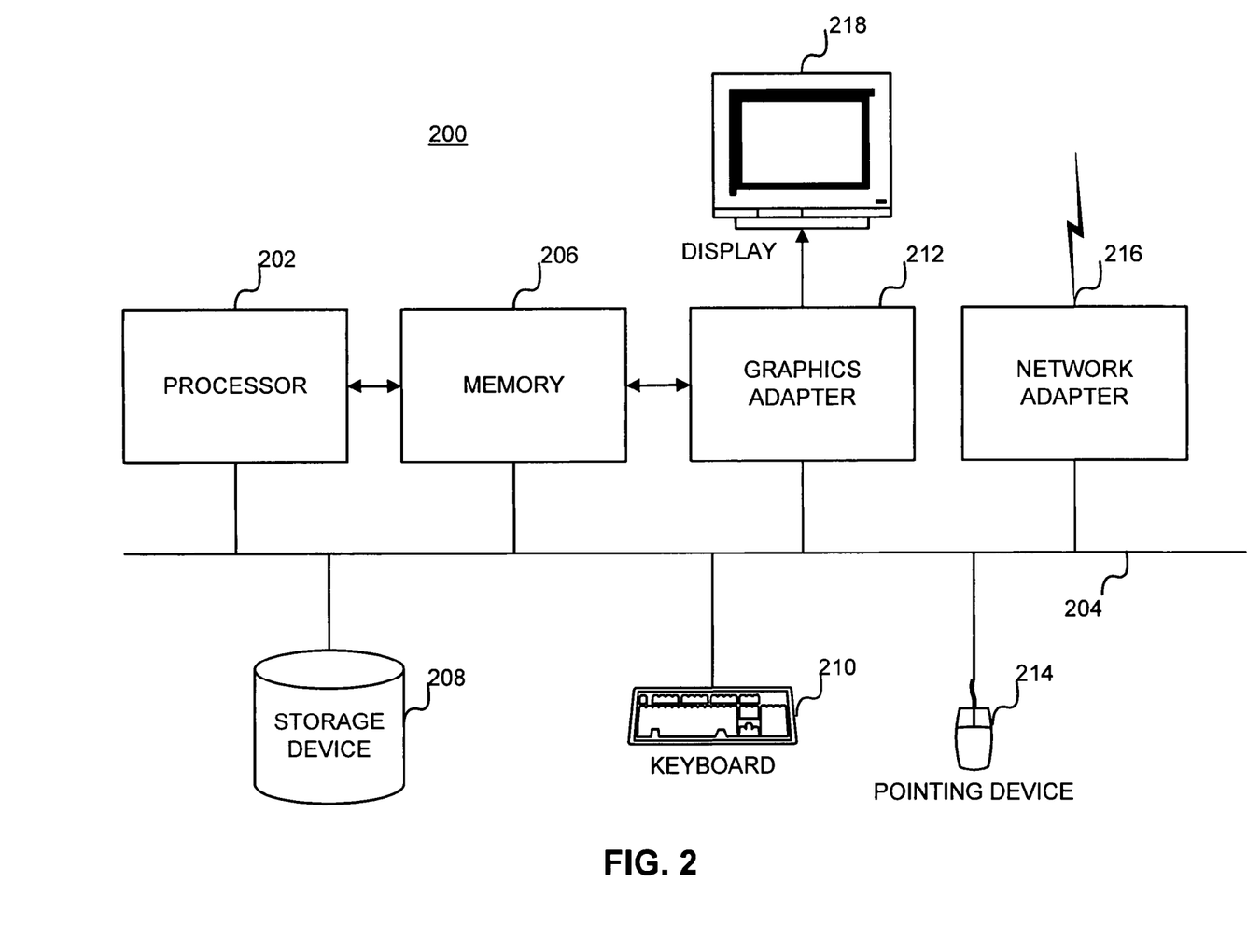
FIG. 2 is a high-level block diagram illustrating a standard computer system 200 for use with the present invention.

FIG. 2 is a high-level block diagram illustrating a functional view of a typical computer system 200 for storing and executing the compatibility module 120, according to one embodiment of the present invention. This computer system 200 can act as a client computer 110, as shown in FIG. 1. However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" refers to computer program logic for providing the specified functionality. A module can be implemented in hardware, firmware, and/or software. Where the any of the modules described herein are implemented as software, the module can be implemented as a standalone program, but can also be implemented in other ways, for example as part of a larger program, as a plurality of separate programs, or as one or more statically or dynamically linked libraries. It will be understood that the modules described herein represent one embodiment of the present invention. Certain embodiments may include other modules. In addition, the embodiments may lack modules described herein and/or distribute the described functionality among the modules in a different manner. Additionally, the functionalities attributed to more than one module can be incorporated into a single module. In one embodiment of the present invention, the modules form a computer program product and are stored on a computer-readable storage medium such as the storage device 208, loaded into the memory 206, and executed by the processor 202. Alternatively, hardware or software modules may be stored elsewhere within the computer system 200.

Figure 3:
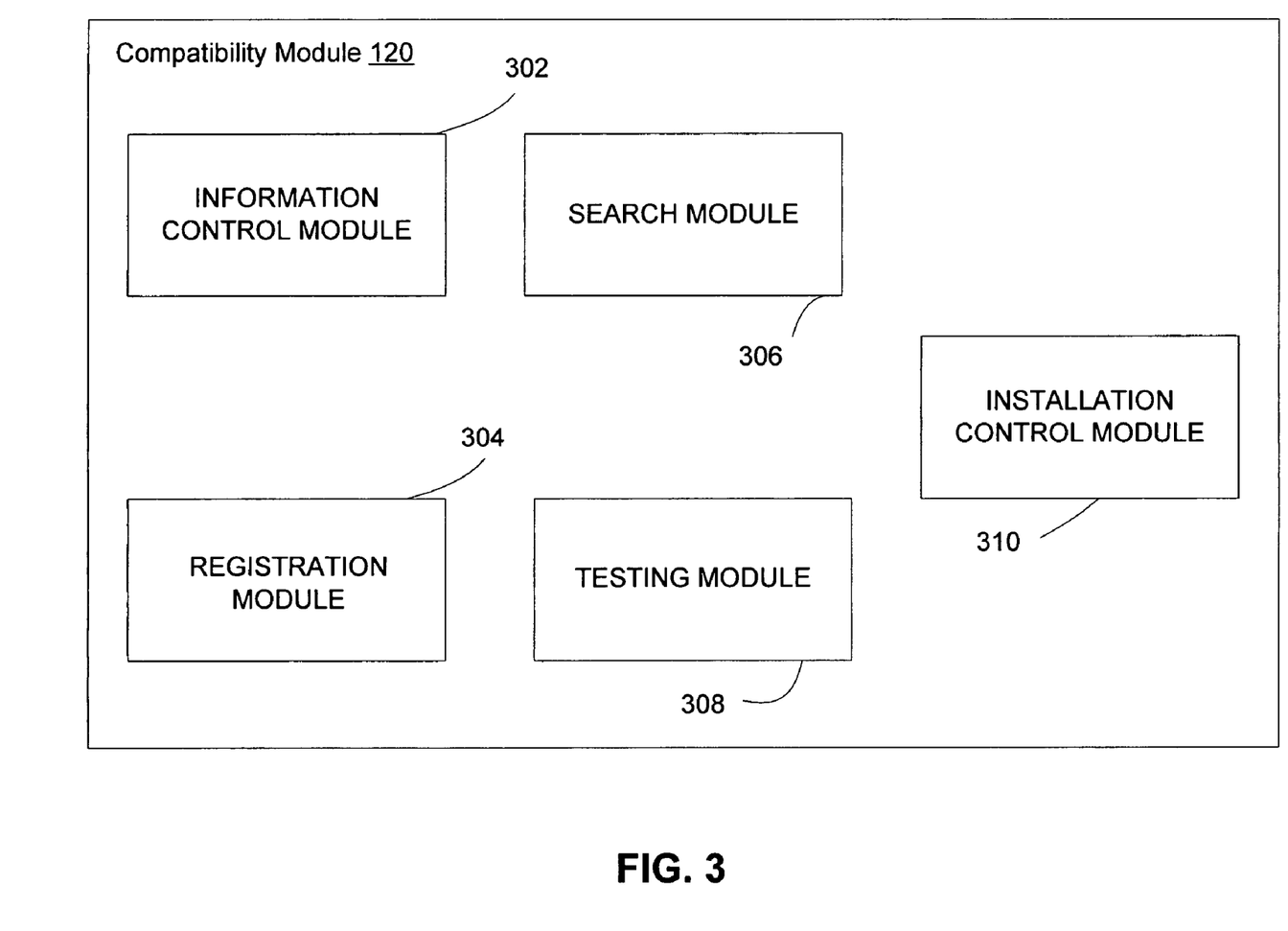
FIG. 3 is a high-level block diagram illustrating the functional modules within the compatibility module 120, according to one embodiment of the present invention.

FIG. 3 is a high-level block diagram illustrating the functional modules within the compatibility module 120, according to one embodiment of the present invention. The compatibility module 120, in the embodiment illustrated in FIG. 3, includes an information control module 302, a registration module 304, a search module 306, a testing module 308, and an installation control module 310. Any or all of these modules can be included in standard installation software (e.g., Installshield), as a part of the software application being installed, or anywhere else in a computer system or on a server (i.e., server 116).

The information control module 302 stores compatibility information describing how to resolve compatibility problems among software applications. In one embodiment, the compatibility information is contained in a compatibility file for a software application being installed on a computing device, and the file is placed by module 302 in a directory associated with the application. In some embodiments, the software application installs a compatibility file (e.g., a DLL, such as a patchinst.dll) into its software application directory. In other embodiments, a compatibility file or compatibility data is placed in a central directory for the computing device or in a database. In still other embodiments, placing a compatibility file in a directory includes modifying information in a preexisting operating system file or otherwise modifying or storing information on a system, and the like. The information control module 302 can be included as a part of the software application being installed, and thus the compatibility file can be placed in the respective location by the software application itself. Alternatively, the information control module 302 can reside on the computing device or some other location external to the first software application (i.e., on server 116 illustrated in FIG. 1), and thus the compatibility file might be placed in its respective location by a central installation control software application, or another program regulating installation processes on the computing device. Similarly, any of modules 304, 306, 308, and/or 310 can be included as a part of the software application being installed, or can alternatively reside on the computing device or some other location external to the software application (i.e., on server 116).

Compatibility files may contain general information about software applications being installed, such as name, version, functionality, etc. The compatibility files might alternatively provide information about compatibility issues or information about how to determine if an application has compatibility issues. In some embodiments, each software application (and/or software application developer) will be responsible for releasing and maintaining a patchable installation library. Thus, as problems are found, each software application updates its respective compatibility file to ensure that the files contain information about new compatibility problems.

In some embodiments, the compatibility module 120 also includes a registration module 304 that registers the compatibility file by placing a compatibility file key in a registry. In some embodiments, the software application being installed on the computing device places a compatibility file, such as a DLL (e.g., a patchinst.dll) into its software application directory, and the registration module 304 registers this DLL (or other type of file or data) by placing a key in a registry or some other information collection location.

The search module 306 searches for compatibility information stored by the information control module 302. In some embodiments, the search module 306 reviews entries in the registry to search for keys identifying compatibility files during installation of a first software application. Thus, the module 306 can examine each key (or at least some of the keys) in the registry until a compatibility file is found, and the search module 306 can notify the testing module 308 of this finding.

The testing module 308 analyzes the compatibility information to determine whether installation of the first software application is compatible with other software applications. In some embodiments, the testing module 308 tests compatibility files found by the search module' 306 to determine if the software applications installed on the computing device are compatible with installation of the first software application. The compatibility files might contain information about whether a particular version of a software application has compatibility issues. The testing module 308 might also contact another computer, such as server 116 illustrated in FIG. 1, and ask that computer to find out about whether an application being installed has compatibility issues with any already installed applications. In some embodiments, the testing module 308 might obtain information from the applications themselves regarding functionality, name, version, release date, etc.

The installation control module 310 regulates the installation based on the result of the compatibility analysis. Regulation of the installation can include various actions, such as allowing the installation to continue, repairing the problem with the installation, blocking the installation, warning the user of the problem before acting, etc. For example, if the compatibility test shows a compatibility problem for installation of the second software application alongside an already installed application, the installation control module 310 might attempt to repair the problem, possibly by applying some type of "patch" or taking some other action to repair the problem. Alternatively, the installation control module 310 can prevent the installation completely or can notify the software application being installed of actions it must take before installation can occur. Similarly, if the installation control module 310 recognizes that there is some incompatibility, but does not know how to repair it, the module 310 might warn the user of this situation or might block the installation. In some embodiments, the installation control module 310 can contact a server 116 or other external computer to obtain more information about the compatibility problem or otherwise obtain regular compatibility updates or updates on user request. If the compatibility test shows no incompatibilities, the installation control module 310 can allow the installation to continue.

Figure 4:
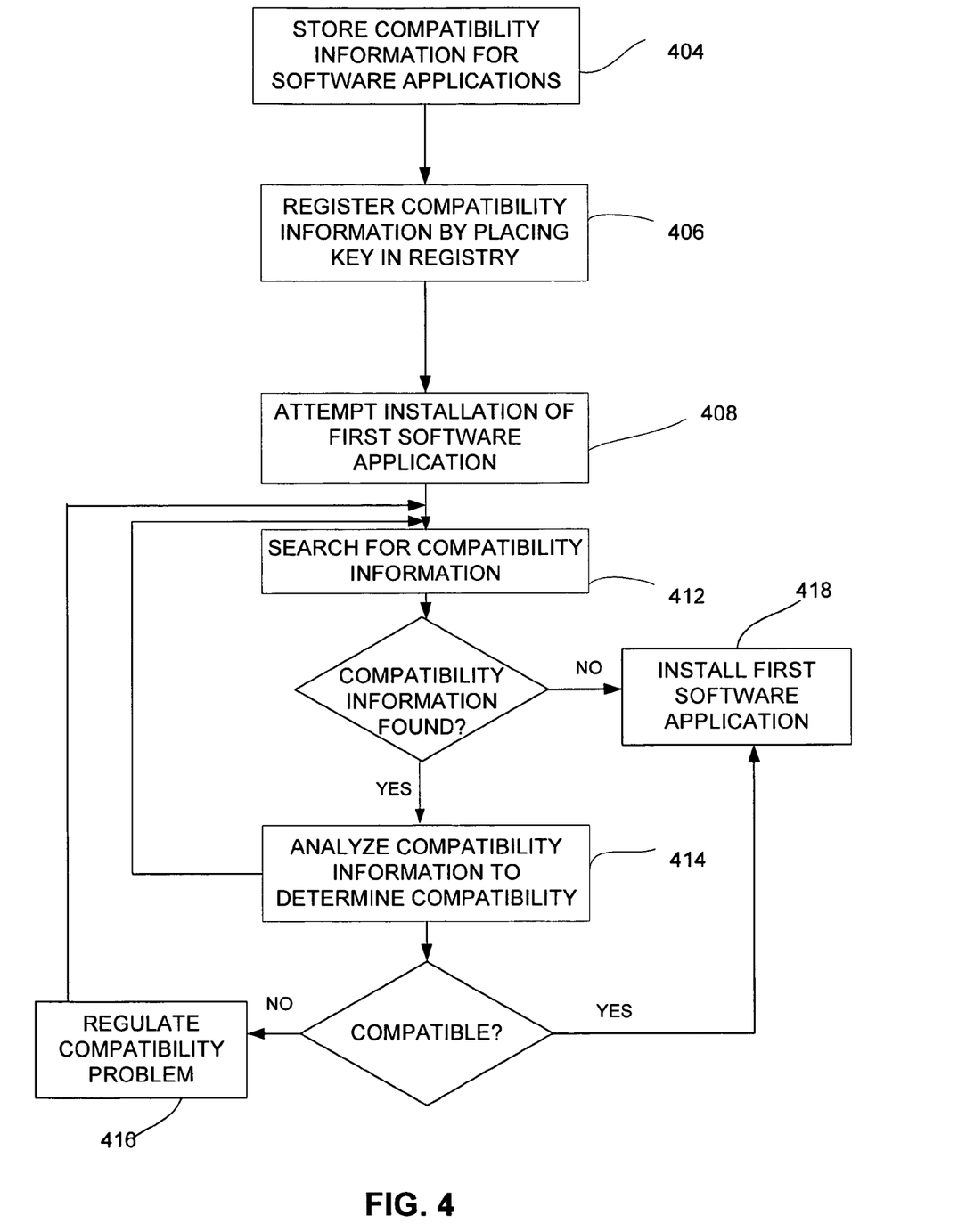
FIG. 4 is a flowchart illustrating steps performed to manage software application compatibility, according to one embodiment of the present invention.

Referring now to FIG. 4, there is shown a flowchart illustrating the operation of the compatibility module 120, according to some embodiments of the present invention. It should be understood that these steps are illustrative only. Different embodiments of the compatibility module 120 may perform the illustrated steps in different orders, omit certain steps, and/or perform additional steps not shown in FIG. 4.

As shown in FIG. 4, the compatibility module 120 stores compatibility information for a plurality of software applications, and the information describes how to resolve compatibility issues amongst the applications. In some embodiments, this storing 404 step includes placing compatibility files for the applications in directories associated with the applications. As described above, these compatibility files can be associated with the software applications, and copies of the files can be installed into the applications' own directories or in a central directory or database for the computing device. In some embodiments, this step 404 simply includes modifying information in a preexisting operating system file or otherwise modifying or storing information on a system. In some embodiments, the compatibility file only includes basic information (e.g., the name of the application and its installation date). The file may also include more detailed information about an application and its compatibility issues, such as the operations of which the application is capable, how the application carries out these operations, etc.

In some embodiments, every software application installed has a compatibility file. In other embodiments, only the applications with known compatibility problems include such files, and a compatibility file may later be generated for an application that has a later-discovered compatibility problem that was not initially present or not initially recognized. These files may also be updated over time by the compatibility module 120 to ensure that new compatibility problems are recorded, and in some embodiments, the compatibility module 120 is connected to server 116 or external computer that provides updates. In some embodiments, a software application creates a compatibility file once it is installed (i.e., on direction of the compatibility module 120). In other embodiments, the compatibility file is created in advance and included with the application upon installation. The compatibility file can be updated regularly over time to ensure that the file contains accurate and up-to-date information regarding compatibility problems. In some embodiments, the compatibility file is updated on request by the user for such an update. The compatibility file can receive update information from numerous locations, such as from server 116 or from new applications being installed that have current compatibility information.

In some embodiments, the compatibility module 120 registers 406 the compatibility file by placing a key in a registry. For example, the first software application might register a file with a central registry for the operating system of the computing device. Thus, placing a key in a registry can include, for example, placing a key in a Microsoft Windows® registry, making one or more notations in one or more configuration files, entering information in one or more locations in a database (e.g., adding sub-objects to an entry object in an object database, or adding or modifying rows in a relational database table), modifying a registration with a server, daemon or software resource (e.g., a network object broker), and the like.

The key can contain various types of information about each installed application. For example, the key may only include very basic information, such as the name of the application and its version. The key could also include more detailed information about an application, such as known compatibility problems that the application has with certain other applications, information on how to avoid such problems or repair problems, what the software application does and how it accomplishes its tasks, etc. The key may include information about every program installed on the computing device, or may only include information about certain type of programs, such as programs that are designed to automatically register themselves with the computing device. In some embodiments, the key may only include information for software applications with a known compatibility issue.

As shown in FIG. 4, an attempted 408 installation of a first software application can occur. This first software application may be a different application from the applications already installed on the computing device, or the first application may be a different version of one or more of the applications already installed. Also, this first application may be different from, but share some components with one or more of the applications already installed on the computing device. Upon attempted 408 installation of a first software application, the compatibility module searches 412 for the compatibility information. In some embodiments, the compatibility module 120 can search 412 for compatibility information by searching the keys in the registry for compatibility files. In some embodiments, the module 120 examines each key in the registry until a compatibility file is found or until it is determined that there are no compatibility files. If no compatibility information is found, the compatibility module 120 can install 418 the first software application. If compatibility information is found, further analysis can be conducted before installation.

If a compatibility information is found, the compatibility module 120 can analyze 414 the information to determine whether installation of the first software application on the computing device is compatible with the software applications installed on the computing device. The module 120 may then analyze this information to determine if there are compatibility problems. In other embodiments, the compatibility module 120 may just review compatibility information found and determine from the information whether there are any compatibility problems with the application associated with the compatibility information. For example, the module 120 may just request the application's name, version, release date, etc. The module 120 may then contact a separate collection of information about whether this application installation will be a problem. Thus, the module 120 may gather information from a local file or database storing compatibility information. In other embodiments, the module 120 may contact server 116 or external computer to gather information.

The compatibility information may additionally include instructions about how to repair the problem and what actions to take next or what actions may need to occur at a later date to avoid compatibility problems. For example, two applications may be compatible up until the point that the first one performs a particular function that raises a compatibility problem, and thus the compatibility module 120 may notify this application of certain actions it must take in the future before performing that function to avoid problems. If it is unclear how to repair the problem, the module 120 may contact server 116 to gather more information about how to resolve the compatibility issue.

When analyzing 414 compatibility information, the compatibility module 120 may determine that there is no compatibility problem between the first application and other software applications installed on the computing device. The module 120 can then allow installation 418 of the first software application. However, if a compatibility problem is detected, the module 120 can regulate 416 or attempt to correct the compatibility problem. As stated above, the compatibility file may contain information about resolving the problem, or information may be obtained from an external source (i.e., from server 116). Regulating 416 the problem can include modifying something in one of the applications or providing instructions to the applications to avoid incompatibility. Regulating 416 the problem can include notifying the user of a problem and/or allowing the user to choose a course of action. In some cases, regulating 416 the problem can include blocking the installation either permanently or temporarily until some future action can be taken or future information gathered.

Once a compatibility problem is found and corrected, the compatibility module 120 will again search 412 for more compatibility information or search for more compatibility files and proceed again through steps 412, 414, 416, and/or 418 until all compatibility problems are resolved and the application is installed 418. If the application installation is blocked at some point, the module 120 can either continue going through the compatibility files at this point or can end the searching 412.

The compatibility module 120 can also be upgradable and its own various new and old versions can check with one another to ensure compatibility. New interfaces can be added in the future without affecting the compatibility files that do not implement the new interface.

There are a number of situations in which the compatibility module 120 described herein is useful. For example, when a user installs a newly released application and then attempts to install an older but different application, the newer application's compatibility file will be aware of compatibility issues (i.e., the newer application's patchinst.dll may know of the compatibility problem). The compatibility module 120 can make changes on the system to prevent the problem from occurring and allow the installation to continue. As another example, when a user installs an older, previously released application and then attempts to install a newer version of the same application over the older one, a bug in the installer of the new version that was not caught during testing may cause the new version's installation to fail. However, a patch may be sent to the old version via an external source (i.e., via server 116) to make the older version aware, and to cause an update of its compatibility file (i.e., a patch may be sent down to make the old version's patchinst.dll aware of this issue) allowing the older version to prevent to the compatibility problem. As an additional example, the compatibility module 120 can be useful in situations in which a user installs two applications that both provide a similar functionality (i.e., a firewall application and an antivirus application that includes firewall functionality). One of the two applications can yield to the functionality of the other, and the two applications can work together to determine which will provide the functionality for the computing device (or each may provide different parts of the function).

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer program product comprising a computer-readable storage medium having computer program logic embodied therein for managing software application compatibility, the computer program logic comprising:

an information control module for storing compatibility information for a plurality of software applications, the stored compatibility information provided by a given software application during installation of the software application on a computing device, the stored compatibility information being updatable and describing for the software application how to resolve compatibility problems with other software applications currently installed on the computing device, wherein the compatibility information is stored as one or more compatibility files for one or more of the plurality of applications, and wherein the compatibility files are placed in directories associated with the applications;

a registration module for registering the compatibility files by placing keys for the compatibility files in a registry;

a search module for searching for the stored compatibility information during installation of a first software application on the computing device, wherein the search module reviews the keys in the registry to search for the compatibility files;

a testing module for analyzing the stored compatibility information to determine whether the installation of the first software application on the computing device is compatible with the plurality of software applications installed on the computing device; and an installation control module for regulating the installation based on the compatibility analysis result.

2. The computer program product of claim 1, wherein the compatibility files contain information regarding compatibility problems between the plurality of software applications and the first software application.

3. The computer program product of claim 1, wherein the first software application is different from but shares some functionality with one or more of the plurality of software applications.

4. The computer program product of claim 1, wherein the installation control module regulates installation in response to finding a compatibility problem by applying a patch to fix a problem in a currently installed application that is affecting the installation of the first software application.

5. The computer program product of claim 1, wherein the computing device is connected to a network of computers and the computing device receives compatibility updates from one or more of the computers.

6. The computer program product of claim 1, wherein the compatibility information is stored as one or more dynamic link libraries.

7. A computer-implemented method of managing software application compatibility, comprising:

storing compatibility information for a plurality of software applications, the stored compatibility information provided by a given software application during installation of the software application on a computing device, the stored compatibility information being updatable and describing for the software application how to resolve compatibility problems with other software applications currently installed on the computing device, wherein the compatibility information is stored as one or more compatibility files for one or more of the plurality of applications, and wherein the compatibility files are placed in directories associated with the applications;

registering the compatibility files by placing keys for the compatibility files in a registry;

searching for compatibility information during installation of a first software application on the computing device, wherein the searching further comprises reviewing the keys in the registry to search for compatibility files;

analyzing the compatibility information to determine whether the installation of the first software application on the computing device is compatible with the plurality of software applications installed on the computing device; and regulating the installation based on the compatibility analysis result.

8. The method of claim 7, wherein analyzing compatibility information further comprises reviewing the contents of the compatibility files for information about compatibility problems between the first software application and the plurality of software applications.

9. The method of claim 7, further comprising updating the stored compatibility information by receiving compatibility information updates from one or more of computers connected to a network of computers.

10. The method of claim 7, wherein regulating the installation based on the compatibility analysis result further comprises:

finding no compatibility problems; and allowing installation of the first software application.

11. The method of claim 7, wherein regulating the installation based on the compatibility analysis result further comprises: finding a compatibility problem; repairing the compatibility problem; and permitting the installation to proceed with the repaired compatibility problem.

12. The method of claim 11, wherein repairing the compatibility problem further comprises making a modification on the computing device to prevent the compatibility problem from occurring.

13. A computer system for managing software application compatibility, comprising:

a computer-readable storage medium storing executable software modules comprising:

an information control module for storing compatibility information for a plurality of software applications, the stored compatibility information provided by a given software application during installation of the software application on a computing device, the stored compatibility information being updatable and describing for the software application how to resolve compatibility problems with other software applications currently installed on the computing device, wherein the compatibility information is stored as one or more compatibility files for one or more of the plurality of applications, and wherein the compatibility files are placed in directories associated with the applications;

a registration module for registering the compatibility files by placing keys in a registry;

a search module for searching for the stored compatibility information during installation of a first software application on the computing device, wherein the search module reviews the keys in the registry to search for the compatibility files;

a testing module for analyzing the stored compatibility information to determine whether the installation of the first software application on the computing device is compatible with the plurality of software applications installed on the computing device;

an installation control module for regulating the installation based on the compatibility analysis result; and a processor configured to execute the software modules stored by the computer readable storage medium.

14. The system of claim 13, wherein the installation control module regulates installation in response to finding a compatibility problem by repairing the compatibility problem and allowing the installation of the first software application to continue.

15. The system of claim 13, wherein the computing device is connected to a network of computers and the computing device receives compatibility updates from one or more of the computers.

16. The system of claim 13, wherein the first software application is different from but shares some functionality with one or more of the plurality of software applications.

* * * * *